United States Patent [19]

Knudsen et al.

[11] Patent Number: 4,809,104
[45] Date of Patent: Feb. 28, 1989

[54] RECORDING HEAD AND SUPPORT ARM FOR STRETCHED SURFACE RECORDING MEDIUM

[75] Inventors: James K. Knudsen; Perry, both of St. Paul, Minn.

[73] Assignee: Minnesota Mining and Manufacturing Company, St. Paul, Minn.

[21] Appl. No.: 206,963

[22] Filed: Jun. 9, 1988

Related U.S. Application Data

[63] Continuation of Ser. No. 120,748, Nov. 13, 1987, abandoned, which is a continuation-in-part of Ser. No. 768,509, Aug. 22, 1985, abandoned.

[51] Int. Cl.$^4$ .......................... G11B 5/48; G11B 5/187
[52] U.S. Cl. ..................... 360/104; 360/103; 360/122; 360/129; 360/105
[58] Field of Search ............... 360/102, 103, 104, 105, 360/109, 122, 129

[56] References Cited

U.S. PATENT DOCUMENTS

| | | | |
|---|---|---|---|
| 3,582,917 | 6/1971 | Hertrich et al. | 360/102 |
| 3,961,372 | 6/1976 | Brock et al. | 360/102 |
| 4,167,765 | 9/1979 | Watrous | 360/103 |
| 4,300,176 | 11/1981 | Gilovich et al. | 360/105 |
| 4,375,656 | 3/1983 | Radman, Jr. et al. | 360/102 |
| 4,396,965 | 8/1983 | DeMoss | 360/102 |
| 4,605,977 | 8/1986 | Matthews | 360/102 X |

FOREIGN PATENT DOCUMENTS 0207064 11/1984 Japan .................................. 360/103

OTHER PUBLICATIONS

IBM Technical Disclosure Bulletin, Spherical Multigroove Magnetic Head Design, W. Hehl et al., vol. 20, No. 8, Jan. 1978.
IBM Technical Disclosure Bulletin, Magnetic Recording Head Having Controlled Flying Height Above Flexible Media, A. J. Bowen, vol. 19, No. 11, Apr. 1977.
IBM Technical Disclosure Bulletin, Multiple Slotted Head Contour, G. W. Brock et al., vol. 20, No. 1, Jun. 1977.
IBM Technical Disclosure Bulletin, Head Suspension Assemblies with Internally Preloaded Dimple, J. H. Nayck, vol. 26, No. 6, Nov. 1983.
"Elastohydrodynamic Analysis of Head to Flexible Disk Interface Phenomena" by J. P. Licari and F. K. King from the Journal of Applied Mechanics, vol. 48, p. 763, 12/81.

Primary Examiner—Robert S. Tupper
Assistant Examiner—Andrew L. Sniezek
Attorney, Agent, or Firm—Donald M. Sell; David W. Anderson

[57] ABSTRACT

For use with a stretched surface recording disk, a recording head having a spherical surface and a series of parallel grooves adjacent the disk and a support arm assembly which maintains the recording head in proper attitudinal relationship to the disk.

7 Claims, 3 Drawing Sheets

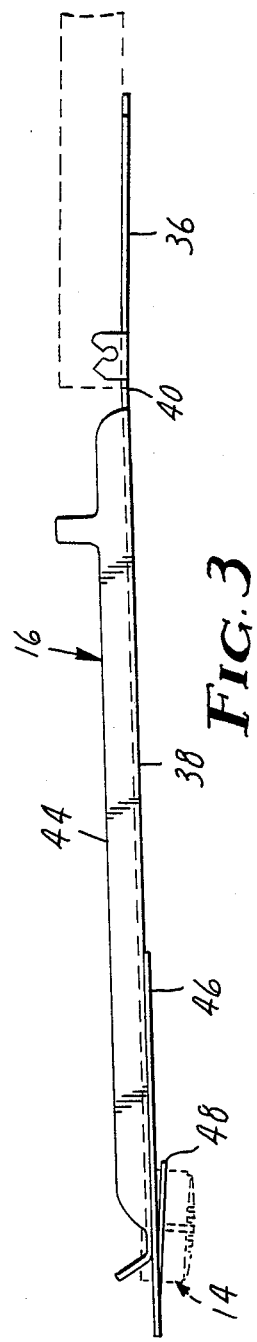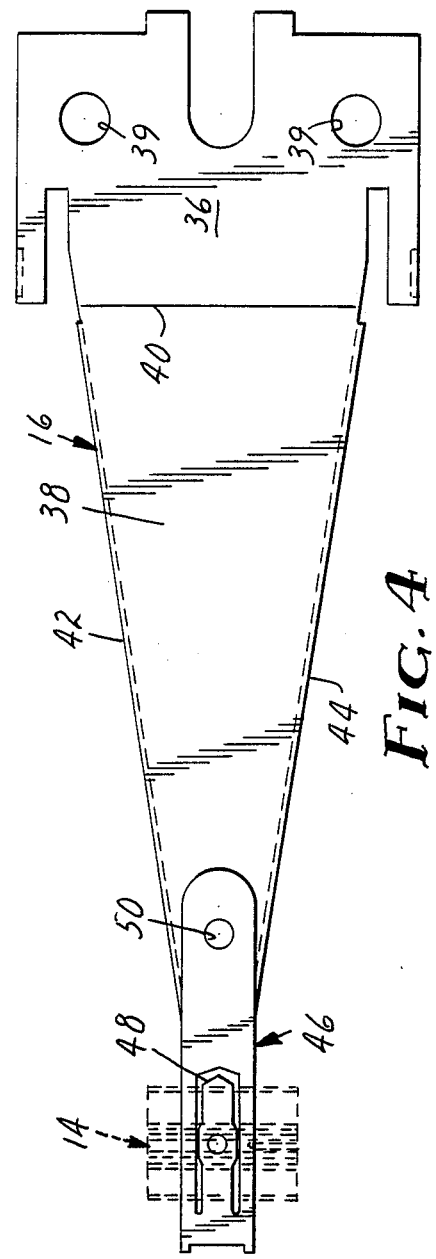

RECORDING HEAD AND SUPPORT ARM FOR STRETCHED SURFACE RECORDING MEDIUM

This is a continuation of application Ser. No. 120,748 filed Nov. 13, 1987, now abandoned, which is a continuation-in-part of application Ser. No. 768,509 filed Aug. 22, 1985, now abandoned.

BACKGROUND OF THE INVENTION

1. Field of the Invention

This invention relates to stretched surface recording (SSR) disks and, more particularly, magnetic transducer heads for use in conjunction with such SSR disks.

2. Description of the Prior Art

Data recording configurations have been proposed in which a recording head is "flown" relative to a magnetic recording medium by moving the recording head rapidly relative to the recording medium and allowing an air bearing to support the head above the surface of the recording medium. Typical spacings between the recording head and the medium are on the order of a few tenths of a micrometer and must be maintained to prevent damage to either the recording head or the recording medium. At the same time, the flying height of the head relative to the medium must be closely controlled to maintain recording quality and the flying height cannot fluctuate or modulation of the signal imparted from the recording head to the recording medium will occur.

The present invention consists basically of a recording head having a spherical surface in proximity to the recording medium and a series of grooves in the spherical surface which are aligned with the direction of relative movement between the recording head and the recording medium. This recording head is suspended above and biased toward a stretched flexible sheet of recording film by a support arm which maintains the head grooves in alignment with the direction of relative movement between the head and the film, but which allows the recording head limited movement to compensate for irregularities in the film surface, variable tension in the recording film, foreign particles between the head and the film and disturbances caused by bumping or vibration.

A head similar to that utilized in the present invention has been disclosed in *IBM Technical Disclosure Bulletins* volume 19, No. 11, April 1977; volume 20, No. 1, June 1977 and volume 20, No. 8, January 1978. These heads, however, are designed for use in a so-called "Bernoulli flight deck" wherein the head is rigidly mounted and a flexible film disk is rotated in proximity to the head. Thus the problems encountered in attempting to suspend such a head above a rotating film need not have been and were not considered.

A support arm similar to that used in the present invention has been employed for a number of years in conjunction with the flying of recording heads relative to rigid recording disks. In this context, the problems of head design to allow flying relative to a flexible film need not have been and were not considered.

SUMMARY OF THE INVENTION

The present invention discloses a recording head and support arm assembly which combines and utilizes the advantages of each to provide a structure which results in a recording head flying in a stable fashion in very close proximity to a thin, flexible stretched surface recording (SSR) film. Flying heights of between 0.10 and 0.15 micrometers have been achieved compared to the typical 0.25 to 0.50 micrometers of the rigid disks of the prior art.

In particular, the present invention comprises a head and support arm assembly for positioning a recording head in proximity to a rotating stretched surface recording disk having at least one thin film tensioned on a supporting substrate, with the recording head and support arm assembly comprising a magnetic transducer head including a spherical surface adjacent the thin film, a series of parallel grooves opening at the spherical surface and aligned with the direction of relative movement between the head and the thin film and a recording core disposed substantially at the spherical surface and generally centered with respect to the grooves and the head transversely to the direction of relative movement between the head and the film, and a support arm mounting the head and resiliently biasing the head toward the thin film, the arm resisting movement of the head in the direction of relative movement between the head and the thin film and permitting limited rotational movement of the head relative to the plane of the thin film about an axis parallel to the radius of the disk and an axis parallel to the direction of relative movement between the head and the thin film, the support arm thereby maintaining the head grooves parallel to the direction of relative movement between the head and the thin film while permitting rotative movement of the spherical surface relative to the thin film.

BRIEF DESCRIPTION OF THE DRAWINGS

The present invention will be more thoroughly described with reference to the accompanying drawings, wherein like numbers refer to like parts in the several views, and wherein

FIG. 3 is a side elevational view of the recording head and support arm assembly;

FIG. 4 is a top plan view of the recording head and support arm assembly;

DESCRIPTION OF THE PREFERRED EMBODIMENT

Figure 1:
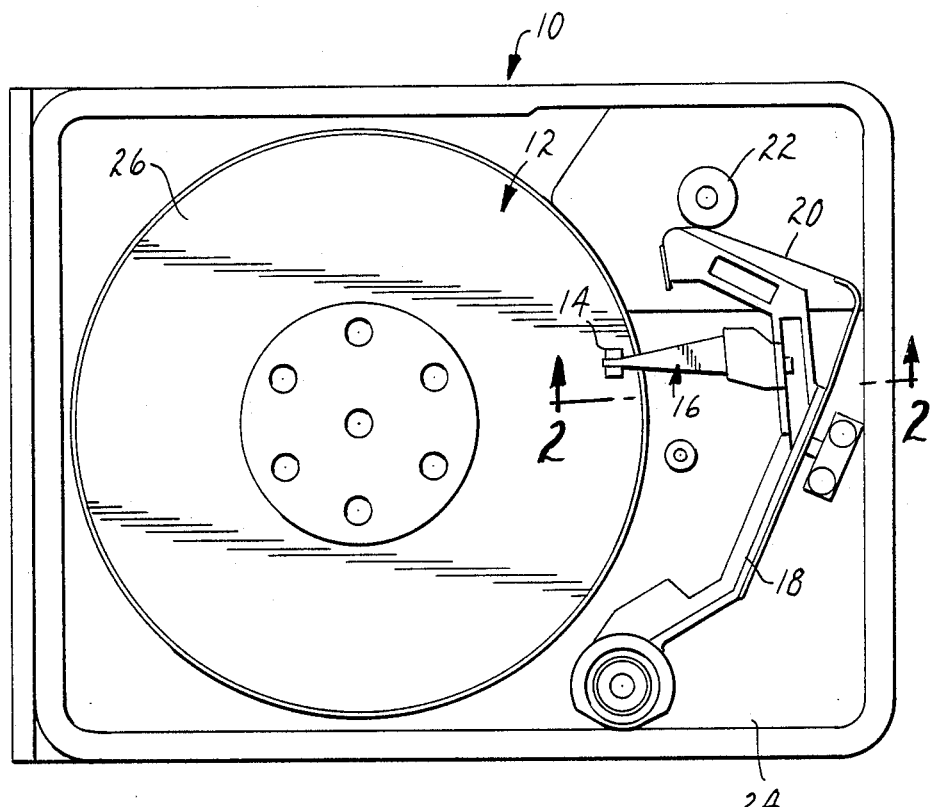
FIG. 1 is a top plan view of a data recording device including a recording head and support arm assembly of the present invention.

FIG. 1 illustrates a stretched surface recording (SSR) device, generally indicated as 10, which includes an SSR disk 12 which is rapidly rotated relative to a recording and playback head 14 which is mounted on a support arm 16 and radially traversed across the surface of the SSR disk 12 by a pivoting cue arm 18. The cue arm 18 is driven by a wire or ribbon 20 wrapped around a capstan 22, which capstan 22 is in turn driven by a stepper motor (not shown). The entire mechanism is supported by an enclosure 24 which contains electronics (not shown) controlling the recording and playback head 14 and a motor (not shown) for driving the SSR disk 12. The means for transporting the head is not part of the present invention, and the cue arm 18 could be replaced by another transport, such as a carriage moving on a linear track.

Figure 2:
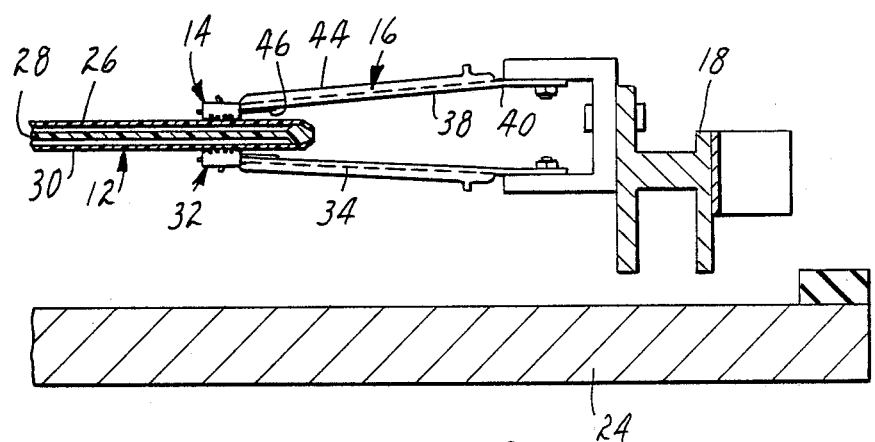
FIG. 2 is a cross-sectional view of the data recording device of FIG. 1, taken generally along the line 2—2 of FIG. 1.

As best seen in FIG. 2, the SSR disk 12 includes at least one thin polymeric film 26 which is suitably coated with a magnetic material (not shown) to enable the recording process. The thin film 26 is stretched across and bonded to a rigid polymeric substrate 28 which maintains the film 26 in tension and thus provides a flat, resilient recording surface. As further illustrated in FIG. 2, the substrate 28 may support a second thin polymeric film 30 and the cue arm 18 may support a second recording and playback head 32 mounted on a second support arm 34. The head 32 and the support arm 34 are identical to the head 14 and the support arm 16, respectively.

The support arm 16 is manufactured by Brum-Ko Magnetics Corporation, Elkhorn, Nebr., is best seen in FIGS. 3 and 4, and includes a mounting portion 36 which is rigidly attached to the cue arm 18 by means of two holes 37 which accept screws or bolts. Extending from the mounting portion 36 is a biasing portion 38 which is angled with respect to the mounting portion 36 by bending the support arm 16 along a fold line 40. The support arm 16 is shown in FIG. 3 in approximately the position the arm 16 will assume in operation. The angle of bend between the biasing portion 38 and the mounting portion 36 is approximately 15° when the support arm 16 is unloaded. The material of the support arm 16 is resilient stainless steel and a bend of approximately 15° produces a load force at the end of the biasing portion 38 opposite the mounting portion 36 of approximately 0.10 Newton when the biasing portion 38 is in the operating position shown in FIG. 3. The biasing portion 38 includes folded or rolled edges 42 and 44 which increase its rigidity.

Attached to the end of the biasing portion 38 opposite the mounting portion 36 is a stainless steel strip 46 which supports in turn a head attachment tab 48 which is formed by separating three of the edges of the head attachment tab 48 from the strip 46. As may be seen in FIG. 3, the head attachment tab 48 is bent relative to the stainless steel strip 46 so that the attachment tab 48 is substantially parallel to the mounting portion 36 when the support arm 16 is positioned for operation. The stainless steel strip 46 and the biasing portion 38 include a hole 50 which is provided to guide wires (not shown) from the recording head 14 along the support arm 16. For reference, the overall length of the support arm 16 is approximately 32 mm and the width of the mounting portion 36 is approximately 10 mm.

The recording and playback head 14 is attached to the head attachment tab 48 by means of an adhesive and is maintained free of contact between the recording head 14 and the stainless steel strip 46 and the biasing portion 38 of the support arm 16. As noted earlier, the attachment tab 48 maintains the recording head 14 substantially parallel to the mounting portion 36 when the support arm is in the operating position.

Figure 5:
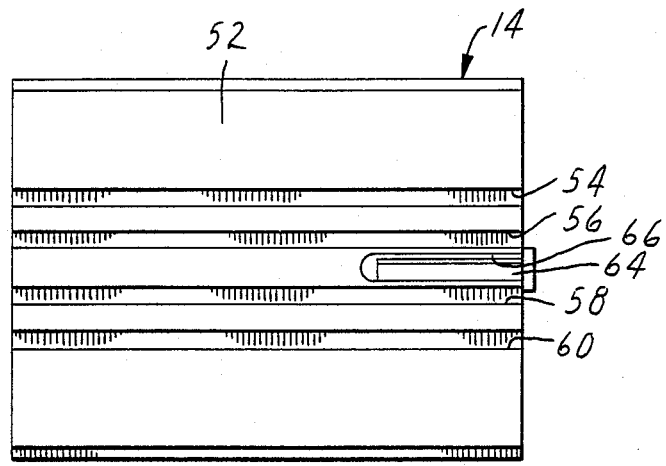
FIG. 5 is a bottom plan view of the recording head.
Figure 6:
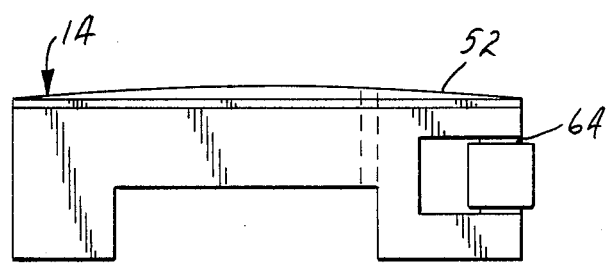
FIG. 6 is a side elevational view of the recording head.
Figure 7:
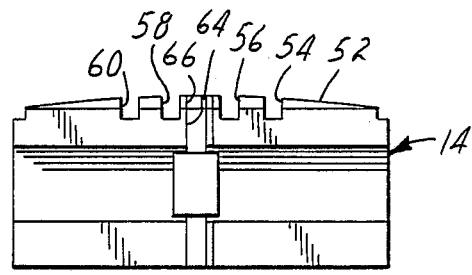
FIG. 7 is an end elevational view of the recording head.

The recording and playback head 14 is best illustrated in FIGS. 5-7 and is manufactured of a ceramic in a generally rectangular shape of approximately 3.2 mm by 4.3 mm. The surface 52 in proximity to the thin film 26 is spherical with a radius of approximately 102 mm. The radius of curvature is dependent upon the tension of the thin film 26 as will be more fully described below. Cut into this spherical surface 52 are four grooves 54-60 which are substantially square in cross-section and are aligned with the direction of film 26 movement relative to the recording head 14. The direction of film 26 movement is illustrated by the arrow 62 in FIG. 5. The width and depth of each groove 54-60 are approximately 0.15 mm and the separation between the outer grooves 54 and 60 and the inner grooves 56 and 58 is approximately 0.20 mm. The separation between the two inner grooves 56 and 58 is approximately 0.30 mm.

The recording and playback head 214 is provided with a recording core 64 which is positioned within a slot 66 formed in the land between the inner grooves 56 and 58. The core 64 is maintained within the slot 66 by glass bonding and, as seen in FIG. 5, is positioned approximately midway between the apex of the spherical surface 52 and the trailing edge 68 of the head 14 with respect to tape movement 62, with the gap of the core preferably located at least 0.50 mm from the trailing edge 68. The core 64 is positioned within the slot 66 so that its upper surface is even with the spherical surface 52.

The grooves 54-60 in combination with the spherical surface 52 are provided to maintain a stable relationship between the recording head 14 and the stretched thin film 26 of the SSR disk 12. Although the thin film 26 is in tension, the film 26 remains flexible and is deformed into a depression or "dimple" in response to an applied load. This dimpling is advantageous, however, because it allows the thin film 26 to conform to the shape of the recording head 14 and thus reduces the gap distance between the thin film 26 and the recording core 64. Except when the SSR disk 12 is stationary, however, the recording head 14 is never actually in contact with the film 26. As the SSR disk 12 rotates, an air cushion is built up between the recording head 14 and the film 26 which simultaneously lifts the recording head 14 from the film 26 surface and forms a slight depression in the film 26 which conforms to the spherical shape of the head surface 52. It will be recognized that a delicate balance of forces exists to maintain the recording head 14 at a proper flying height with respect to the film 26 surface.

This delicate balance is maintained by the support arm 16 in conjunction with the shape of the head surface 52 in proximity to the thin film 26.

The spherical shape of the head surface 52 is chosen to provide a stable air bearing between the head 14 and the film 26. It has been found that a large spherical radius of the head surface 52 produces a wide and very stable air bearing between the head 14 and the film 26. Unfortunately, however, a large radius not only increases stability but also increases the flying height or separation between the head 14 and the film 26. A large separation is detrimental because the core 64 cannot adequately interact with the magnetic recording material found on the surface of the film 26. To reduce the separation between the head 14 and the film 26, the grooves 54-60 are provided which bleed air past the head 14 and decrease the height of the head 14 above the film 26 without disrupting the stability achieved by the large radius of the spherical surface 52. Thus the recording head 14 is provided with a large spherical surface 52 to provide a stable air bearing cushion between the recording head 14 and the film 26 and the grooves 54-60 are provided to decrease the separation between the head 14 and the film 26 to a height which allows proper data transfer between the ferrite core 64 and the magnetic particles of the film 26.

The relationship between the head 14 and the film 26 is also intimately affected by the characteristics of the support arm 16. The support arm 16 must provide a sufficient resilient biasing force between the head 14 and the film 26 to maintain the two in proximity, and must maintain the grooves 54-60 of the head 14 rigidly aligned with the direction of relative movement between the head 14 and the film 26. In addition to these functions, the support arm 16 must allow the recording head 14 to roll about an axis parallel to the direction of relative movement between the head 14 and the film 26 and pitch about an axis parallel to a radius of the SSR disk 12. These movements of the head 14 are necessary to allow the head 14 to compensate for transient conditions such as bumping of the recording device 10, dust and debris on the film 26 and increased or asymmetrical rigidity of the film as the rim of the SSR disk 12 is approached.

The rigidity necessary to maintain the grooves 54-60 of the recording head 14 in alignment with the direction of travel relative to the film 26 is provided by the-rolled-or folded edges 42 and 44 of the biasing portion 38 of the support arm 16. The necessary limited freedom of the recording head 14 to roll and pitch is provided by attaching the recording head 14 to the attachment tab 48 of the support arm 16, which attachment tab 48 remains relatively flexible with respect to the support arm 16 by virtue of the fact that the head attachment tab 48 is connected to the remainder of the support arm 16 along only one edge. Bending of the head attachment tab 48 relative to the support arm 16 so that the head 14 is maintained substantially parallel to the mounting portion 36 of the support arm 16 also contributes to stability at the air bearing between the recording head spherical surface 52 and the film 26.

The head 14 and support arm 16 configuration described has been found to operate suitably with an SSR disk 12 which has a film 26 tension of between about 500 and 900 Newtons per meter and which rotates to produce a velocity in excess of about 9.0 meters per second at the periphery of the disk 12. To maintain a desired flying height of about 0.10 to 0.15 micrometers, the spherical radius of the head surface 52 will have to be increased and the spaces between the slots 54-60 will have to be decreased tension of the film 26 increases. The converse is also true.

As the velocity of the disk 12 decreases to approach the limiting value of about 9.0 meters per second, the slots 54-60 will have to be narrowed or the spaces between the slots 54-60 will have to be increased to maintain the proper flying height. Increased velocities will only slightly increase the flying height.

Stiffness of the polymeric film 26 material has little effect on performance, so long as the effect of film 26 tension dominates the effect of film 26 stiffness. If an inherently stiffer film 26 is utilized, the effect of this stiffness may be compensated for by decreasing the thickness of the film 26. For example, satisfactory performance has been achieved using a film 26 which has a modulus of elasticity of $4.8 \times 10^9$ Newtons per square meter and a thickness of 0.038 mm and a film which has a modulus of elasticity of $2.8 \times 10^{10}$ Newtons per square meter and a thickness of 0.025 mm.

It has been found, however, that a definite relationship exists between the tension of the film 26, wherein tension is defined as the stress in the film multiplied by its thickness, and the spherical radius of the head 14. If the tension is expressed in units of pounds per inch, the sperical radius of the head 14 must be numberically equal to 4/3 the tension, plus or minus 20 percent, in units of inches for the head 14 to operate satisfactorily. For example, with a tension in the film of four pounds per inch (calculated with parameters of a film 26 stress of approximately 2000 pounds per square inch multiplied by a film thickness of 0.0015 inches), the preferred spherical radius of the head is 5.3 inches, with an acceptable deviation of plus or minus 0.8 inches. Although a similar relationship between media tension and head radius can be expressed in any system of measurement, the relationship above is used because of its simplicity.

Thus, although a head similar to that described has been employed in so-called "Bernoulli flight decks", wherein the head is held stationary, it has not heretofore been attempted to utilize such a head at the end of a free support arm and in proximity to an SSR disk and, while support arms similar to those described herein have been employed in conjunction with rigid disks, it has not previously been attempted to use such a support arm in conjunction with the type of head described. Nor has it been attempted to use the head described in an application employing an SSR disk 12.

Furthermore, the prior uses of the individual elements suggest that their combination would not be useful. For example, the attempted use of the combination of the support arm and spherical head could not be used with a rigid disc because there would be only a very small area of proximity between the rigid disc and the spherical he and. This would result in unstable flying characteristics and extremely high pressures between the head and the disc. Similarly, the use of combination of the flexible arm and the spherical head described herein with a low tension media such as floppy or Bernoulli discs will result in wrapping of the media around the head and cause decreased media durability due to contact with the head. Thus the unexpected result that the combination described herein cannot usefully be used with either a rigid media, such as that found in conventional Winchester discs, or low tension media such as Bernoulli or floppy discs. The particular combination of a spherical head and a flexible support has only been found to work satisfactorily with the tensioned media described herein.

There has thus been described a novel recording head 14 and support arm 16 assembly which maintains a recording core in proper proximity to a thin film 26 and maintains a delicate balance of forces at the air bearing between the recording head 14 and the thin film 26.

Although the present invention has been described with respect to only a single embodiment, it is recognized that many modifications will be apparent to those skilled in the art. For example, the edges between the slots 54-60 and the spherical surface 52 may be rounded rather than sharp as shown in FIG. 7. The effect of such rounding has been found equivalent to increasing the width of the slots 54-60. All such modifications which fall within the spirit and scope of the appended claims are intended to be considered part of the invention.

We claim:

1. A recording head and support arm assembly for positioning a recording head in proximity to a rotating stretched surface recording disk having at least one thin film tensioned on a supporting substrate, said head and support arm assembly comprising;
    a magnetic transducer head including a spherical surface adjacent said thin film having a spherical radius numerically equal in units of inches to 4/3 the tension, plus or minus 20 percent, of said film expressed in units of pounds per inch, wherein tension is defined as film stress in units of pounds per square inch multiplied by film thickness in units of inches; a series of parallel grooves in said spherical surface and aligned with the direction of relative movement between said head and said thin film, said head including a recording core disposed substantially at said spherical surface such that said grooves are symmetrically positioned with respect to said core, said head extends transversely to said direction of relative movement between said head and said thin film; and a support arm mounting said head and resiliently biasing said head toward said thin film, said arm resisting movement of said head in the direction of relative movement between said head and said thin film and permitting limited rotational movement of said head relative to said thin film about an axis parallel to a radius of said disk intersecting said head and an axis parallel to said direction of relative movement between said head an said thin film, said support arm thereby maintaining said head grooves parallel to said direction of relative movement between said the ad and said thin film while permitting rotative movement of said spherical surface relative to said thin film.

2. A recording head and support arm assembly according to claim 1 wherein said support arm includes a mounting portion, a biasing portion at an angle with respect to said mounting portion when said biasing portion is in an unloaded state with respect to the stretched surface recording disk and a head attachment tab supporting said head and disposed opposite said mounting portion and substantially parallel to said mounting portion when said support arm is positioned in a loaded state with respect to the stretched surface recording disk.

3. A recording head and support arm assembly according to claim 2 wherein said head attachment tab is generally rectangular and connected at only one edge to said biasing portion to allow relative movement between said head and said biasing portion.

4. A recording head and support arm assembly according to claim 3 wherein said biasing portion includes rolled edges to increase its rigidity.

5. A recording head and support arm assembly according to claim 1 wherein said head includes four grooves symmetrically disposed with respect to the recording core.

6. A recording head and support arm assembly according to claim 5 wherein said grooves each have dimensions which are substantially equal in depth from said spherical surface and width transverse to said direction of relative movement between said head and said thin film.

7. A recording head and support arm assembly according to claim 1 wherein said spherical surface has a substantially rectangular border.

* * * * *

UNITED STATES PATENT AND TRADEMARK OFFICE
CERTIFICATE OF CORRECTION

PATENT NO. : 4,809,104

DATED : February 28, 1989

INVENTOR(S) : James K. Knudsen   David M. Perry

It is certified that error appears in the above-identified patent and that said Letters Patent is hereby corrected as shown below:

Front Page, correct second inventor's name to --David M. Perry--.

Column 4, line 8, correct "214" to read --14--.

Column 5, line 43, after "decreased" insert --as--.

Column 6, line 28, correct "he and" to --head--.

Claim 1, Column 7, line 20, correct "an" to --and--.

Claim 1, Column 7, line 23, correct "the ad" to --head--.

Signed and Sealed this

Eighth Day of August, 1989

Attest:

DONALD J. QUIGG

Attesting Officer    Commissioner of Patents and Trademarks